(12) United States Patent
Chen et al.

(10) Patent No.: US 12,470,780 B1
(45) Date of Patent: Nov. 11, 2025

(54) SUPPLEMENTAL CONTENT PLACEMENT OPTIMIZER

(71) Applicant: NBCUniversal Media, LLC, New York, NY (US)

(72) Inventors: Carol Chen, Park City, UT (US); Aneesh Muthiyan, Harrison, NJ (US); Francis Rizzo, Long Beach, NY (US); Jonathan Jagielski, Bedford, NY (US); Ryan McConville, Westport, CT (US); Robert Davis, Dingsman Ferry, PA (US); David Otto Gonzalez, New York, NY (US)

(73) Assignee: NBCUniversal Media, LLC, New York, NY (US)

( * ) Notice: Subject to any disclaimer, the term of this patent is extended or adjusted under 35 U.S.C. 154(b) by 0 days.

(21) Appl. No.: 18/746,771

(22) Filed: Jun. 18, 2024

(51) Int. Cl.
*H04N 21/81* (2011.01)
(52) U.S. Cl.
CPC .............................. *H04N 21/812* (2013.01)

(58) Field of Classification Search
CPC .................................................. H04N 21/812
See application file for complete search history.

(56) References Cited

U.S. PATENT DOCUMENTS

| 12,333,566 B1 * | 6/2025 | Berrett ............... G06Q 30/0276 |
| 2017/0006342 A1 * | 1/2017 | Nagaraja Rao .. H04N 21/25891 |
| 2022/0329902 A1 * | 10/2022 | Dixon .................. H04N 21/426 |

* cited by examiner

*Primary Examiner* — Michael H Hong
(74) *Attorney, Agent, or Firm* — Fletcher Yoder, P.C.

(57) ABSTRACT

Systems and methods for efficient and reliable cross-platform impression availability across linear and digital streaming content platforms is provided. Specifically, impressions estimates from both linear content platforms and digital content streaming platforms are used to identify relative capacities for satisfying a campaign of placement of the supplemental content. The relative capacities may be used to balance a portion of the capacities across the platforms that are used to satisfy the campaign.

20 Claims, 16 Drawing Sheets

| BLOCK 1 | BLOCK 2 | BLOCK 3 | BLOCK 4 | BLOCK 5 |
|---|---|---|---|---|
| 0    60|60   120|120   180|180   240|240   300|

ONLY 1 UNIT FROM THIS GROUP WILL BE ALLOWED INTO THIS 120 SECOND "WINDOW"

UNIT_1, UNIT_2, UNIT_3, UNIT_4, UNIT_5

*FIG. 15A*

| BLOCK 1 | BLOCK 2 | BLOCK 3 | BLOCK 4 | BLOCK 5 |
|---|---|---|---|---|
| 0    60|60   120|120   180|180   240|240   300|

EITHER UNITS FROM GROUP 1, OR GROUP 2 WILL PLACE INTO THE WINDOW, NOT BOTH

UNIT_1, UNIT_2, UNIT_3, UNIT_4, UNIT_5

UNIT_6, UNIT_7, UNIT_8

*FIG. 15B*

SUPPLEMENTAL CONTENT PLACEMENT OPTIMIZER

BACKGROUND

This disclosure relates generally to a system that facilitates cross-platform optimization of supplemental content (e.g., advertisement) provision for supplemental content campaigns. Specifically, the system provides efficient estimation of content placement availability across linear and digital streaming platforms, enabling efficient placement of supplemental content across platforms.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Traditionally, linear and digital supplemental content (e.g., advertisement) campaigns have been executed separately and based on different sets of factors. In traditional digital campaigns, forecasting has been employed to predict "maximum avails" (e.g., an aggregate number of available supplemental content impressions (e.g., views by individual users), sometimes limited to targeted segments of the audience). Advertisement supplemental content has traditionally been placed to fulfill digital campaign guarantees within the maximum avails. In traditional linear forecasting, supplemental content placement is based on content slots (e.g., advertisement breaks) with particular blocks within these breaks that allow particular types of supplemental content to be placed (e.g., a national block and a regional block, respectively providing a window of time that may be used for national supplemental content and regional supplemental content). For example, while a linear campaign may guarantee a certain number of impressions, ad placement is thought of in the context of number of breaks needed to fulfill the guarantee. That is, both number of impressions and number of breaks are guaranteed under linear campaigns, despite these two numbers not always agreeing with one another. For example, if 1,000,000 impressions are guaranteed in a particular linear campaign, but forecasting predicts that each break has 750,000 avails, either one break or two breaks may be guaranteed. If 1,000,000 impressions and one break are guaranteed, this will result in falling short of the guaranteed impressions by 250,000 impressions, which may result in needing to refund the advertiser or make good on the guaranteed impressions. If 1,000,000 impressions and two breaks are guaranteed, this may result in exceeding the guaranteed impressions by 500,000 impressions, which may result in lost ad revenue. Because traditional linear and digital campaigns are typically executed separately, cross-platform optimization where distribution of guaranteed impressions may be distributed across digital streaming linear platforms has not been available. That is, with traditional techniques and ad transactions, it has not been possible to show an ad with a 1,000,000 impression guarantee in a linear platform break worth 750,000 impressions, and make up the 250,000 difference via digital platforms.

These problems are even more pronounced when targeting supplemental content to specific segments or demographics of an audience (e.g., coffee drinkers, a particular age range, etc.). Further, pricing and pacing of supplemental content campaigns via traditional techniques can be complex and unpredictable, lack transparency to advertisers, and lead to excessive and burdensome in-flight maintenance costs. Further still, as viewership continues to grow in digital streaming platform usage, there is a need to for more flexible cross-platform forecasting, campaign pacing, and ad placement.

BRIEF DESCRIPTION

Certain embodiments commensurate in scope with the originally claimed subject matter are summarized below. These embodiments are not intended to limit the scope of the claimed subject matter, but rather these embodiments are intended only to provide a brief summary of possible forms of the subject matter. Indeed, the subject matter may encompass a variety of forms that may be similar to or different from the embodiments set forth below.

Embodiments provided herein employ a cross-platform decisioning engine to process, pace, and place supplemental content across the various linear and digital streaming end points. For example, this decisioning engine may employ pre-flight and in-flight optimization to pace campaigns through a variety of digital streaming and linear endpoints such that they meet campaign guarantees (e.g., total impressions, targeted impressions, campaign deadlines, etc.) and other Key Performance Indicators (KPIs). In some embodiments, the decisioning engine employs a budget split technique for capacity balancing and predicted excess capacity. In some embodiments, a linear log optimizer may be employed for supplemental content pacing, placement, and campaign performance with respect to linear platforms.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein:

FIGS. 15A and 15B are schematic diagrams, illustrating compositing efficiencies for the MIPs placement model, in accordance with certain embodiments;

DETAILED DESCRIPTION

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Figure 1:
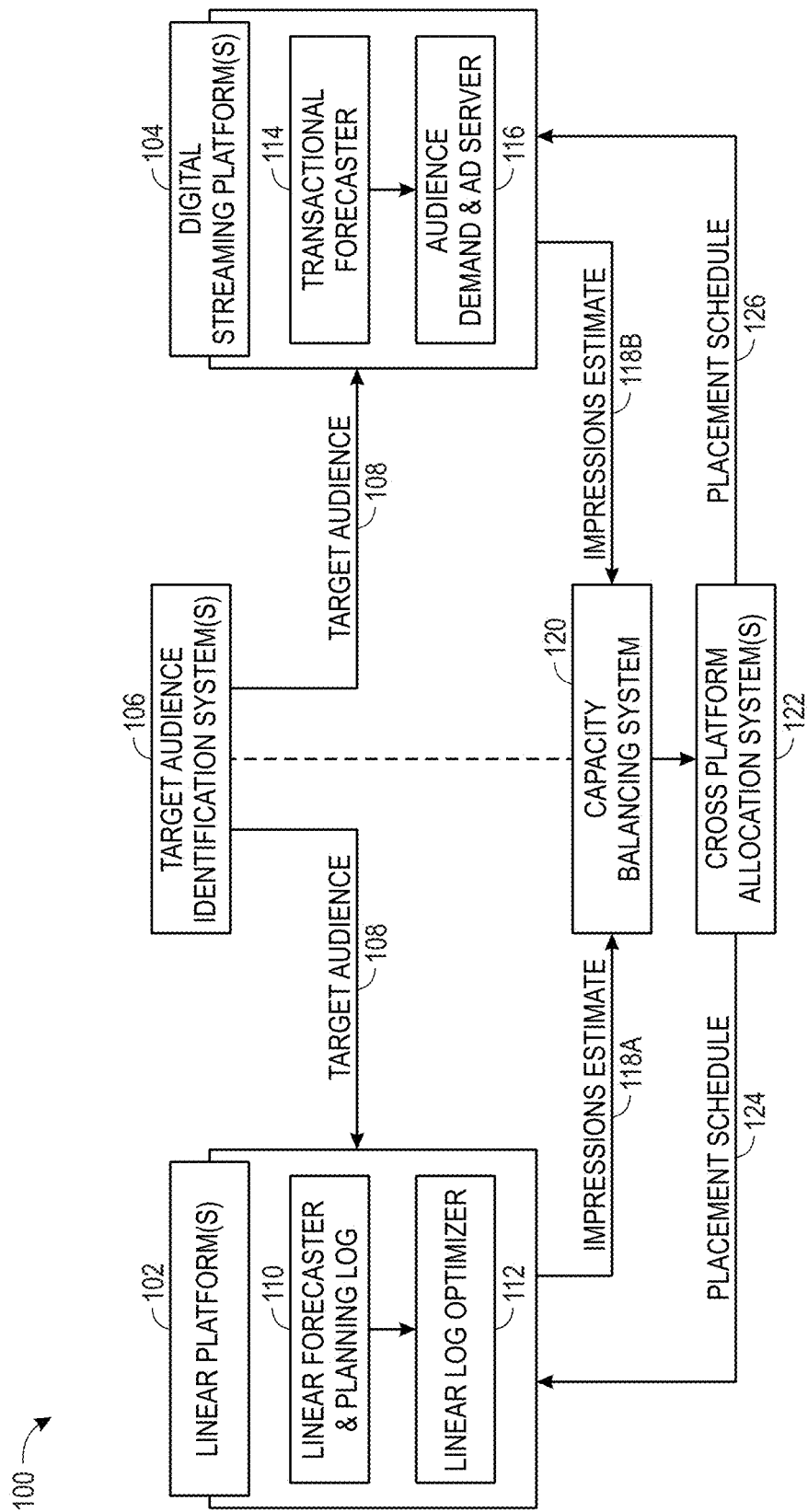
FIG. 1 is a system diagram, illustrating a system for linear log optimization, in accordance with certain embodiments.

As noted above, there remains a need for cross-platform (e.g., linear and digital streaming platform) supplemental content placement, forecasted capacity planning, and campaign performance. With this in mind, FIG. 1 is a system diagram, illustrating a system 100 for linear log optimization for cross-platform supplemental content placement, in accordance with certain embodiments. As mentioned above, cross-platform placement of supplemental content may refer to supplemental content placements within one or more linear platforms 102 and one or more digital streaming platforms 104.

A target audience identification system 106 is employed to identify target audience data 108, such target audience identifiers, sizes and overlap there between. Using the target audience data 108, forecasting of impression availability may be performed on both the linear platforms 102 and the digital streaming platforms 104. For example, the target audience data 108 may be provided to a linear forecaster and planning log 110, which may forecast impressions and time capacity on the linear channels. Further, the linear log optimizer 112 may identify placements and pacing and plan (e.g., campaign satisfaction scoring) for linear supplemental content placements.

On this digital streaming side, a transactional forecaster 114 may forecast reach (number of unique impressions) for supplemental content via the digital streaming platform 104 and multiply the reach by an allowed impression frequency (number of times a piece of supplemental content is allowed to be presented to a particular user) to get a forecasted impression capacity. Further, current demand (existing impression orders) may be subtracted from the impression capacity to forecast a maximum number of available impressions for the supplemental content placement. An audience demand and ad server 116 may identify a probability of placement of the supplemental content based upon ad server rules and audience demand.

Based upon the forecasting data provided by the linear forecaster and planning log 110 and the linear log optimizer 112, impression estimates 118A for the linear platform 102 may be identified. Further using the forecasting data from the transactional forecaster 114 and the audience demand and ad server 116, impression estimates 118B for the digital streaming platforms 104 may be determined.

Using the impression estimates 118A and 118B, the capacity balancing system 120 may perform capacity balancing of impressions across both the linear platforms 102 and the digital streaming platforms 104. For example, the capacity balancing system 120 may utilize a budget split technique to identify cross-platform allocations of impressions that will efficiently fulfill guaranteed campaign impressions.

To balance capacity across the linear platforms 102 and the digital streaming platforms 104, the budget split technique receives the impressions estimates 118A and 118B, predicts excess capacity based upon these estimates, and determines total revenue allocation across the linear platforms 102 and the digital streaming platforms 104. The capacity balancing system 120 may identify capacity allocations for a supplemental content campaign between the linear platforms 102 and the digital streaming platforms 104. As will be discussed in more detail below, a cross-platform optimization may balance placements across the linear platforms 102 and the digital streaming platforms 104 to satisfy the campaign guarantees and other business requirements.

The cross-platform allocation system 122 may implement supplemental content placements in the linear platforms 102 and the digital streaming platforms 104 in accordance with the cross-platform allocation determined by the cross-platform allocation system. For example, as illustrated, a placement schedule 124 may be provided for the linear platforms 102 and placement requests 126 may be provided for the digital streaming platforms 104. Although FIG. 1 illustrates separate linear platforms 102 and digital streaming platforms 104 for illustrative purposes, in another aspect, the linear platforms 102 and digital streaming platforms 104 may be represented by a single consolidated platform that interfaces with the target audience identification system 106, the capacity balancing system 120, and/or the cross-platform allocation system 122 for forecasting impressions, planning, and placing secondary content.

Figure 2:
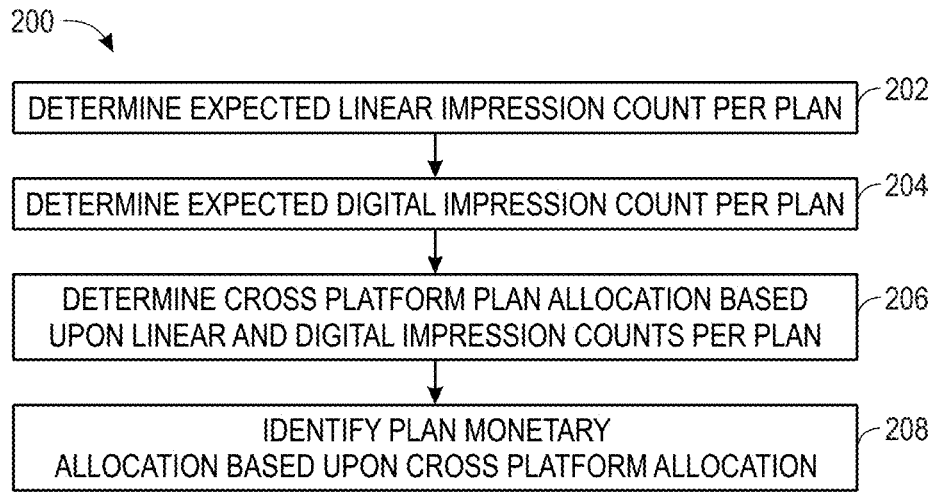
FIG. 2 is a flowchart, illustrating a process for cross-platform optimization, in accordance with certain embodiments.

FIG. 2 is a flowchart, illustrating a process 200 for cross-platform optimization, in accordance with certain embodiments. In general, the cross-platform optimization enables one supplemental content placement plan across multiple platforms and/or platform types (e.g., linear platforms 102 and digital streaming platforms 104). To create a cross-platform plan, the cross-platform optimization uses a resource allocation optimization model to balance capacity across both linear platforms 102 and digital platforms 104 for a particular target supplemental content, and to determine how much revenue is allocated across the linear platforms 102 and digital platforms 104 via expected linear impressions and expected digital impressions, respectively.

For the linear platforms 102, the process 200 includes determining an expected linear impression count per plan (block 202). Specifically, an estimate of the likelihood that a particular plan's supplemental content ("unit") will be placed in various ad breaks (or blocks) of the linear content is determined and multiplied by the forecasted number of impressions of the target audience for that plan. The results are summed across all the ad blocks of the potential ad plan to get expected linear impressions. This may be represented by the following equation:

$$L(I)_{pa} = \sum_{b \in B}^{b} (C_{bp} \times I_{ba})$$

Where:
C is the likelihood of block b being chosen for unit u from plan p. Linear likelihood estimation is discussed in more detail below with respect to FIGS. 3 and 4.
I is the forecasted impressions of block b for audience a
B is the set of blocks on the log For the digital platforms 104, an expected digital impression count per plan is determined (block 204). To do this, reach is forecasted and multiplied by a frequency cap (e.g., limiting a number of impressions from each individual user or household). The resulting value is multiplied by the likelihood of those digital impressions resulting in expected digital impressions. This may be represented by the following equation:

$$D(I)_{pa} = R_{pa} \times F_p \times C_p$$

Where:
R is Forecasted Reach of the plan for that audience
F is the Frequency cap for the plan
C is the Likelihood of impressions for that plan The cross-platform plan allocation is then determined based upon the determined linear and digital impression counts per plan (block 206). This may be done by summing the linear and digital impression counts per plan. Further, the plan's monetary allocation may also be determined (block 208). For example, the expected linear impressions and expected digital impressions may be multiplied by a cost per thousand (CPM) value (e.g., a revenue for a set of impressions) and summed together to determine total dollars allocated across the linear and digital platforms under the potential ad plan. This may be represented by the following equation:

$$TotalDollarsAllocated = \sum_{p \in P}^{p} \sum_{a \in A}^{a} (L(I)_{pa} * CPM) + \sum_{p \in P}^{p} \sum_{a \in A}^{a} (D(I)_{pa} * CPM)$$

Where: TotalDollarsAllocated≤TotalBudget

As illustrated, the total dollars allocated for the plan should be less than the total budget for the plan, as there may be lost revenues if a higher monetary value is allocated than budgeted for the plan.

Figure 3:
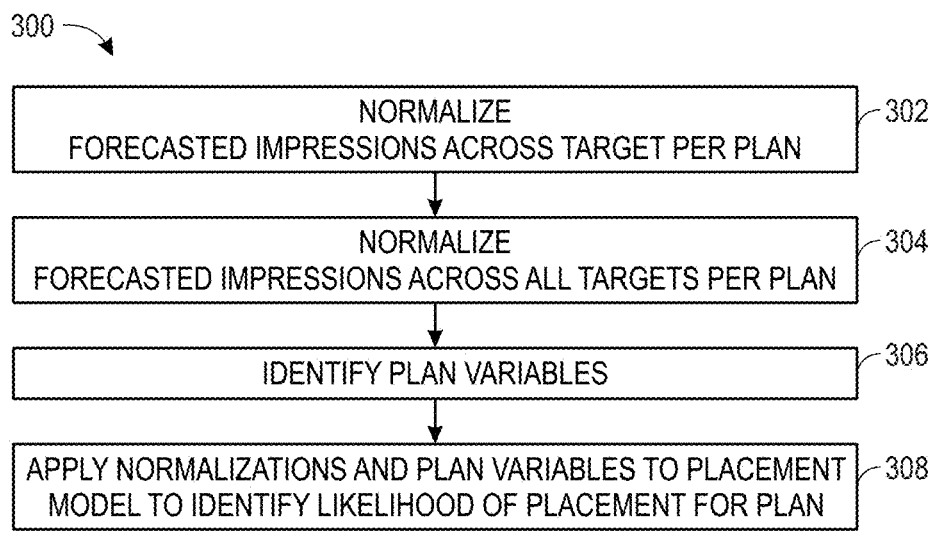
FIG. 3 is a flowchart, illustrating a process for linear likelihood estimation, in accordance with certain embodiments.
Figure 4:
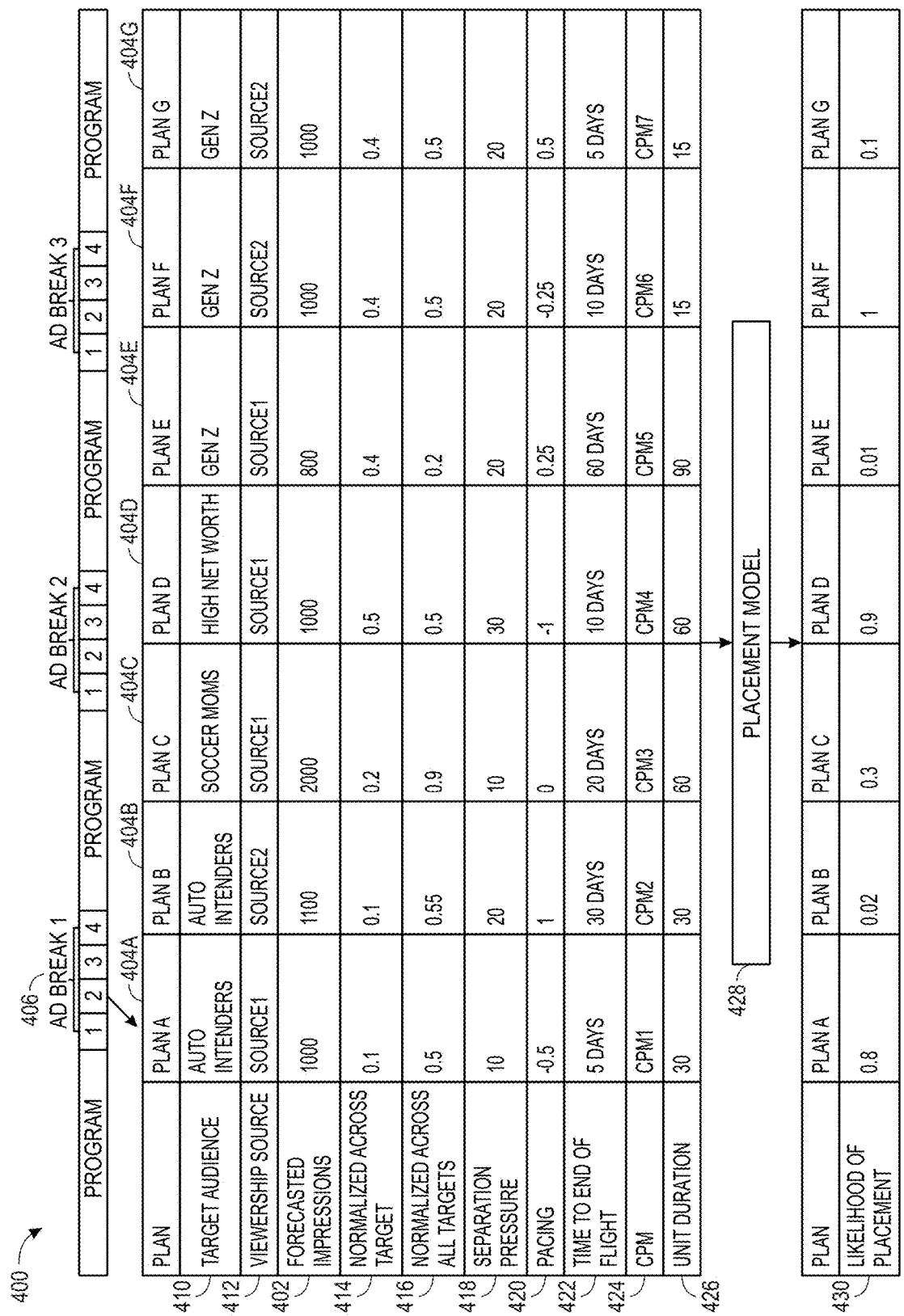
FIG. 4 is a schematic diagram, illustrating an example of linear likelihood estimation, in accordance with certain embodiments.

Having discussed the overall cross-platform optimization, FIG. 3 is a flowchart, illustrating a process 300 for linear likelihood estimation used to derive the expected linear impression count of block 202 of FIG. 2, in accordance with certain embodiments. FIG. 4 is a schematic diagram 400, illustrating an example implementation of the process 300, in accordance with certain embodiments. For simplicity, these figures will be discussed together. As illustrated in diagram 400, forecasted impressions 402 associated with a particular plan (e.g., 404A-G, collectively "plans 404) are provided for a particular ad break (e.g. Ad Break 1 406) of a linear content 408. The plans 404 each may have a particular target audience 410 and viewership source 412.

To identify how suitable a particular ad break is for the particular plan's target audience 410, placement factor values for the plans may be determined. The placement factor values may be used to evaluate and/or compare potential placements across plans.

For example, the process 300 begins by normalizing each plan's forecasted linear impressions across the target per plan (block 302). In other words, a normalization of the particular target audience 410 across other ad breaks is performed to identify a relational magnitude of the forecasted impressions for the particular target audience 410 (e.g., "Auto Intenders") for the currently analyzed ad break (e.g., Ad Break 1 406) compared to the alternative ad breaks of the linear content 408. In this manner, the most suitable ad break for placement of supplemental content may be identified for the particular target audience 410. These normalizations across target 414 are illustrated in FIG. 4.

Further, it may be desirable to identify a relational magnitude of the currently analyzed ad break to satisfy impressions for a particular target audience 410 over other target audiences 410. This may indicate the best suitability for a particular ad break for a particular target audience 410. Accordingly, the forecasted impressions are normalized across all targets (block 304). These normalizations across all targets 416 are illustrated in FIG. 4.

Additional plan variables (or placement factor values) are identified (block 306). For example, as illustrated in FIG. 4. For example, a separation pressure 418 (a value measuring separation constraints of the plan's supplemental content to other supplemental content) is identified. Further, pacing 420 (e.g., a normalized number indicating how well the plan's guaranteed impressions are being met) is identified. A time to end of flight 422 (e.g., a remaining campaign time for capture of additional impressions) is also determined. A cost measurement 424 (e.g., cost per thousand impressions (CPM)) for the plan's presented supplemental content is identified. Also, a unit duration 426 or length of the plan's supplemental content is identified.

The normalizations and plan variables are the applied to a placement model 428 to identify the likelihood of placement 430 for the plan per block in an ad break 406 (block 308). For example, as illustrated in FIG. 4, the likelihood of placement indicates a likelihood of placement of a respective plan's unit (e.g., supplemental content) within a particular block (e.g. block 1) of an ad break being analyzed (e.g., Ad Break 1 406). As illustrated, the likelihood of placement of the units of plan A within the block of ad break 1 406 is 0.8. Relatively higher likelihood of placement values may indicate that, given placement constraints, a particular block of the ad break is relatively suitable for a plan's units and, in some cases, that other blocks may be less suitable. Relatively lower likelihood of placement values may indicate that, given the placement constraints, the particular block of the ad break is not suitable for placement of the plan's units and, in some cases, that other blocks of other ad breaks are more suitable. In some embodiments, the number of units of a particular plan may be distributed across the likelihood of placements 430 for each of the blocks of the ad units where the plan's units may be placed. Thus, the likelihood of placement values for a particular plan across all possible blocks of ad breaks where units may be placed, when summed, may equal the number of units of the plan to be placed. In some instances, the likelihood of placement 430 does not account for duration constraints of the blocks and/or ad breaks. Accordingly, as discussed in more detail below, the likelihood of placements 430 may be further constrained based upon the block and/or ad break duration to derive a fractional expected placement for a plan's units in a block of an ad break, when factoring in a duration of the block and/or ad break.

As plan units (e.g., supplemental content) are actually placed, re-allocation based upon actual placements may occur. In other words, a feedback loop may result in successive likelihood of placement calculations based upon actual placements, updated pacing, etc.

Figure 5:
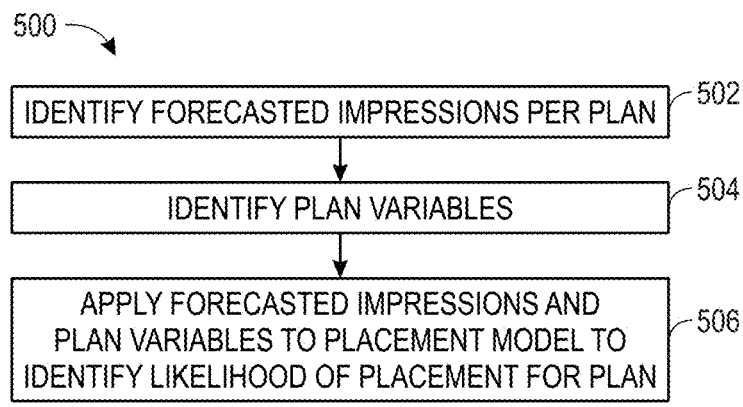
FIG. 5 is a flowchart, illustrating a process for digital likelihood estimation, in accordance with certain embodiments.
Figure 6:
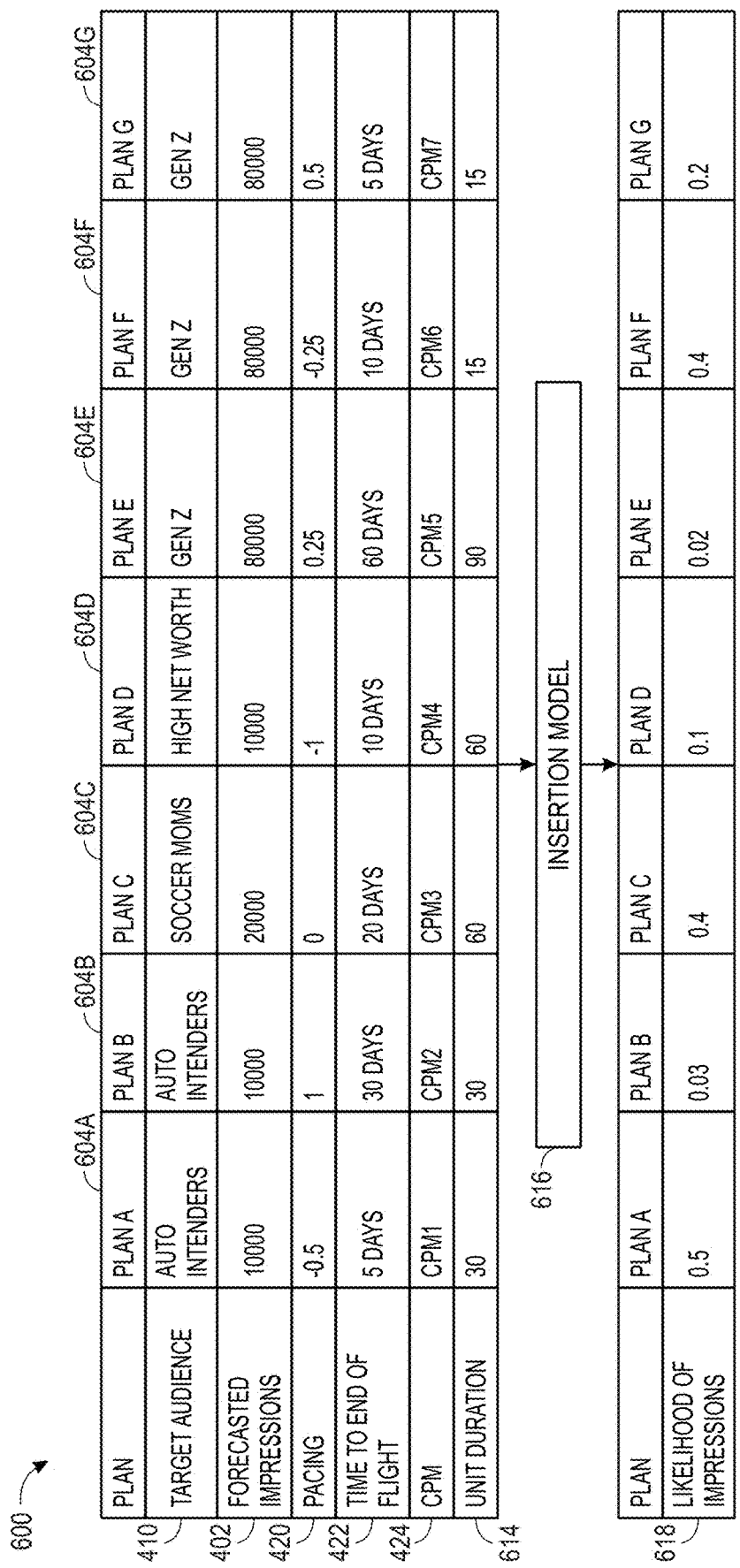
FIG. 6 is a schematic diagram, illustrating an example of digital likelihood estimation, in accordance with certain embodiments.

Having discussed linear likelihood estimation, the discussion now turns to identifying a digital likelihood estimation. FIG. 5 is a flowchart, illustrating a process 500 for digital likelihood estimation, in accordance with certain embodiments. FIG. 6 is a schematic diagram 600, illustrating an example of digital likelihood estimation, in accordance with certain embodiments. For simplicity, these figures will be discussed together.

As illustrated in FIG. 5, the process 500 includes identifying forecasted impressions per plan (block 502). For example, as illustrated in FIG. 6, for each plan 604A-G (collectively 604), a forecasted impression 602 is provided for a particular target audience 606 of the plan 604.

At block 504, plan variables are identified. As illustrated, the plan variables may include pacing 608, a normalized value (e.g., between −1 and 1) indicating a relative pace of fulfilling guaranteed impressions relative to other plans. The time to end of flight 610 may be identified, providing an indication of a remaining amount of time to fulfill impressions via placements of the plan's supplemental content. A cost measurement 612 (e.g., cost per thousand impressions (CPM)) for the plan's presented supplemental content is identified. The unit duration 614 may be identified, which provides a duration of the plan's supplemental content.

The forecasted impressions 602 and plan variables (e.g., 608-614) are applied to an insertion model 616 to identify the likelihood of impressions 618 for a particular plan 604 via the digital streaming platform. The likelihood of impressions 618 represents a likelihood of a plan's unit being presented to a target audience (e.g., via a digital platform).

Figure 7:
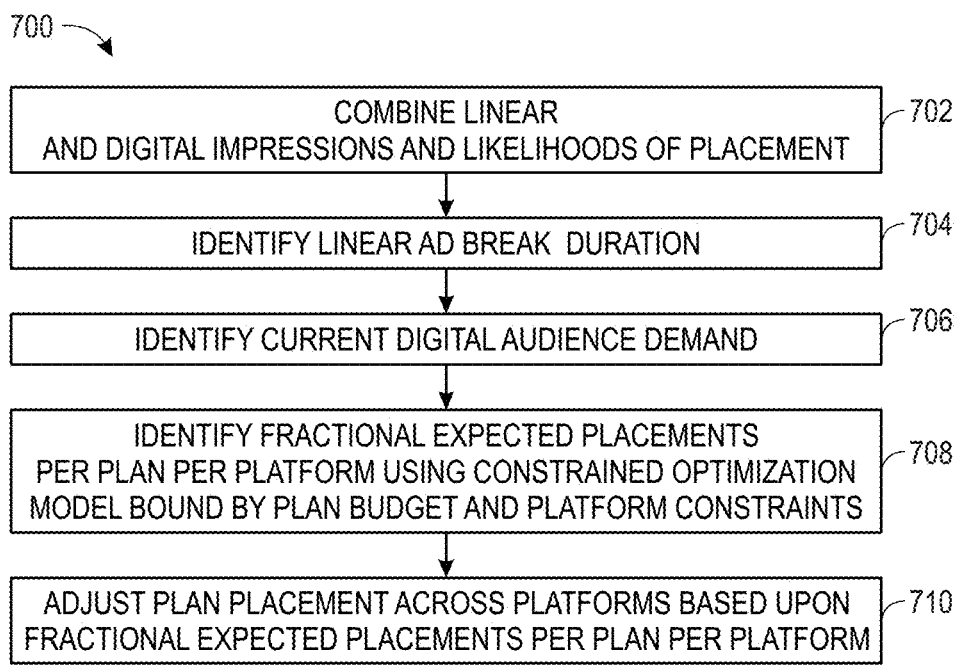
FIG. 7 is a flowchart, illustrating a process for cross-platform allocation, in accordance with certain embodiments.
Figure 8:
FIG. 8 is a schematic diagram, illustrating an example of cross-platform allocation, in accordance with certain embodiments.

FIG. 7 is a flowchart, illustrating a process 700 for cross-platform allocation, in accordance with certain embodiments. FIG. 8 is a schematic diagram 800, illustrating an example of cross-platform allocation, in accordance with certain embodiments. For simplicity, these figures will be discussed together.

Process 700 includes combining the linear and digital impressions and likelihoods of placement (block 702). For example, as illustrated in FIG. 8, combined forecasted impressions 802 and combined likelihood of placements/impressions 804 (e.g., including likelihood of placements 430 of FIG. 4 and Likelihood of Impressions 618 of FIG. 6 for linear plans 404 and digital streaming plans 604) are combined.

Next, overall plan limitations are determined. For example, linear placements may be limited by a duration of the ad break and digital streaming placements may be limited by current audience demand, which encompasses audience overlap and plans already taking up placements in the digital streaming placements. Accordingly, at block 704, the linear ad break durations are identified. Further, at block 706. The current digital audience demand is determined.

Fractional expected placements 806 per plan per platform are then determined (block 708). As mentioned above, the fractional expected placements 806 may constrain linear placements based upon the duration of the blocks of the ad breaks and/or the duration of the ad breaks. Further, the likelihood of impressions may be constrained by the digital audience demand consuming a portion of the forecasted impressions). Specifically, a constrained optimization model is bounded by the plan budget and platform constraints (e.g. the linear ad break duration and the digital audience demand) to identify the fractional expected placements. In this manner, the likelihood estimates account for placement limitations, such as a limited amount of time with which supplemental content can be placed and a limited number of times that supplemental content may be presented to a particular viewer.

Based upon the fractional expected placements per plan per platform, the plans may be adjusted across the platforms to provide efficient use of supplemental content placement blocks/spots to accurately provide a guaranteed number of impressions (block 710). In this manner, efficient supplemental content presentation in line with guaranteed impressions may be provided, reducing campaign under or over performance.

Figure 9:
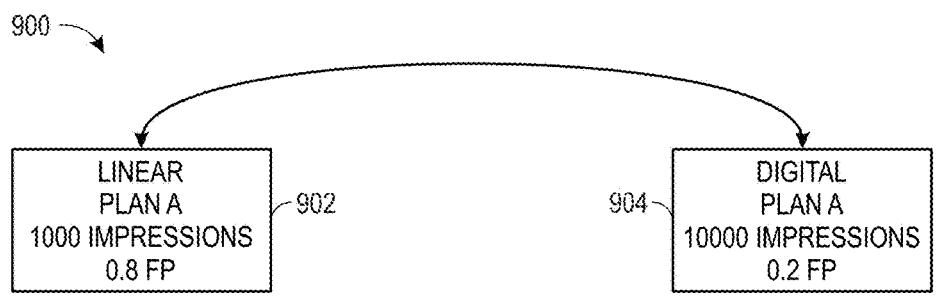
FIG. 9 is a schematic diagram, illustrating cross-platform placement adjustment based upon the cross-platform allocation of FIG. 8, in accordance with certain embodiments.

FIG. 9 is a schematic diagram 900, illustrating cross-platform placement adjustment based upon the cross-platform allocation of FIG. 8, in accordance with certain embodiments. As illustrated, based upon the techniques provided herein, placement allocation of implementation 902 of Plan A on a linear platform and implementation 902 of Plan A on a digital streaming platform may be adjusted to shift impressions used to fulfill guaranteed impressions of a campaign from one platform to another. This may add new flexibility to create well-performing campaigns that pace well and follow the campaign budget.

Figure 10:
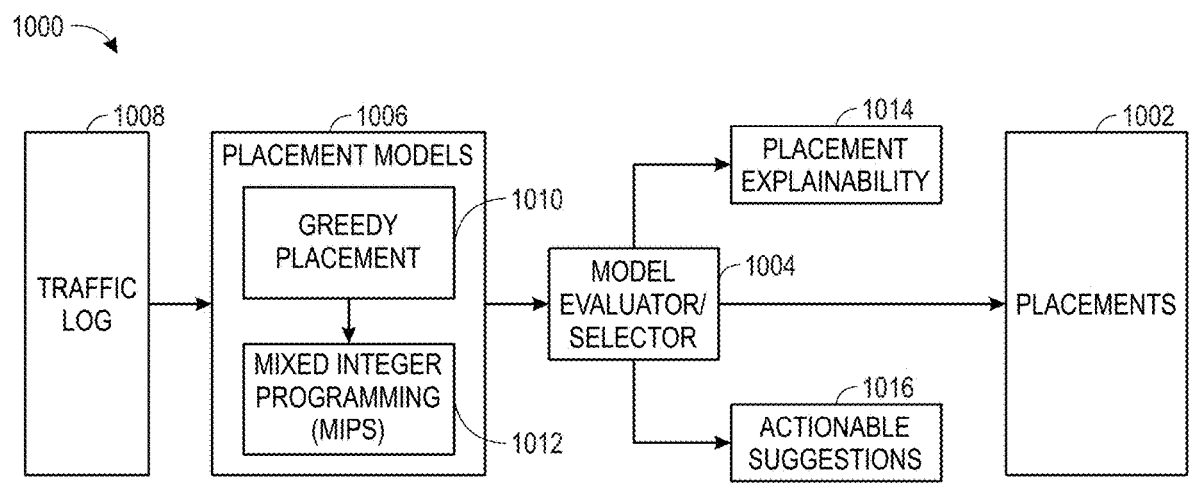
FIG. 10 is a schematic diagram, illustrating a linear log optimizer that provides placement by selecting an efficient placement model from a plurality of placement models, in accordance with certain embodiments.

Because linear programming is more static in nature, using pre-scheduled placements of supplemental content in available supplemental content/ad spots or "blocks" within the primary content to present the supplemental content, linear scheduling optimization may be useful to ensure the proper supplemental content is scheduled in the linear programming to satisfy supplemental content objectives. FIG. 10 is a schematic diagram, illustrating a linear log optimizer 1000 that identifies supplemental content placements 1002 for the linear log, by selecting, via a model evaluator and/or selector tool 1004, an efficient placement model from a plurality of placement models 1006 to determine the placements 1002, in accordance with certain embodiments. Specifically, the linear log optimizer 1000 aims to place a desired number of units/pieces of supplemental content per plan within the primary content supplemental content/ad slots/blocks, to achieve plan goals (e.g., the number of impressions needing fulfilment) and/or other goals.

As mentioned above, a fractional placement per plan value is estimated for each plan. The fractional placement per plan value provides an indication of probability of placement of a plan's unit within a particular block. When each of the fractional placements for a given plan are summed, this provides an indication of an estimate of a number of units to place per plan in blocks of the primary content.

In the determined placements 1002 for linear, the linear log optimizer 1000 may attempt to satisfy a number of optimization goals. A listing of example goals is provided below. This listing is not intended to be exhaustive, but instead is provided to show examples of some log goals that may be applied by the linear log optimizer 1000. In some embodiments, certain goals may be prioritized over others, resulting in placements 1002 that consider relatively higher-prioritized goals over relatively lower-prioritized goals. For example, in some embodiments that use the example goals provided below, the priority may be set in accordance with the order in which the examples are discussed below.

A block fill optimization may attempt to maximize a percent of the block time filled on the log. In other words, this goal may attempt to efficiently use all available block time, minimizing unused block time.

A number of units optimization may attempt to maximize the number of units placed on the log. For example, when two units can be placed in lieu of one unit, the placement of the two units may be preferred, as this would create a higher number of units on the log.

A dollars optimization may aim to maximize the dollar amount assigned to the units placed on the log. In other words, a unit with a relatively higher revenue may be placed before a unit with a relatively lower revenue.

An ad spot priority optimization may aim to place relatively higher-priority ad units over relatively lower-priority ad units. For example, certain types of units, certain unit owners, etc. may have a higher priority than others. In one example, BrandX's units may take priority over BrandY's units and, thus, the units of BrandX may be placed prior to the units of BrandY.

An impressions optimization may aim to maximize a number of impressions for each plan. For example, if a plan targets coffee drinkers, which are more present during block 1 relative to block 2, block 1 may provide more impressions than block 2 and this optimization would, thus, result in units for this plan being placed in block 1 prior to block 2.

A plan performance optimization may utilize the identified pacing of plans and/or forecasted future impressions to identify placements of units of the various plans. For example, plan A with a relatively slow placing (e.g., slower rate of impression fulfillment) with weaker forecasted future impression availability, may be placed earlier than plan B with a similar pacing but with higher forecasted future impression availability, as it may be more difficult to satisfy plan A. Further, plan C with a relatively higher pacing may be placed after plans A and B, as plan C is being fulfilled at a faster pace than plans A and B.

Taking these goals into account, the placement models 1006 identify placements of supplemental content "units" to be placed, as identified by a traffic log 1008 input. The traffic log 1008 input may provide a future schedule of programs, units of availability of ad breaks and blocks for each program, and/or ad units and plans that can be placed. For example, the units may be provided to a greedy placement model 1010 and/or a mixed integer programming (MIPs) placement model 1012 to identify candidate placements for the received units from the traffic log 1008.

As illustrated and will be discussed in more detail below, the greedy placement model 1010, in some cases, may provide initial placement candidates for the MIPs placement model 1012, which may result in significant processing efficiencies, while also providing granular results from the MIPs placement model 1012.

The model evaluator/selector 1004 may identify one of the set of placement candidate results from the placement models 1006 that provide the most suitable results for finalized placements 1002 and set the placements 1002 based upon these most suitable results.

As may be appreciated, each of the placement models 1006 may have strengths and weaknesses. For example, with the greedy placement model 1006 it may be relatively easy to formulate objective functions and add business rules to identify optimized placements. Further, this model may provide runtime placement explanations as to why certain placements are selected over others, providing data useful to the placement explainability tool 1014. This model may provide a fast solution and provide full control inherently at each incremental placement step. However, the step-by-step approach may not find the "most" optimal solution.

Further, the placement explainability tool 1014 may identify and present, based upon the candidate placement results, an explanation as to why particular units were or were not placed in the placements 1002. For example, in some cases, units with stronger placement constraints (e.g., requirements not to be near a large number of other types of units, etc.) may be harder to place. A graphical user interface of the placement explainability tool 1014 may provide a graphical indication associated with these units explaining that the units were not placed because of these strong constraints.

In contrast, the MIPs model 1012 may provide the most optimal solution, but may be quite processing intensive, requiring significant processing resources (e.g., CPU, memory, etc.) and processing time. Further, relatively complex software implementations may be required compared to greedy placement model 1010, especially when considering scalability of units, blocks, and placement rules. Additionally, it may be more difficult to identify placement explainability with a MIPs model 1012, as any number of factors along the path may cause lack of placement of units in the path.

The MIPs model 1012 may, in some embodiments, be enhanced to more efficiently solve the optimization. Specifically, as will be discussed in more detail below, placement eligibility rules (e.g., unit separation rules) may be composited into an efficient format for MIPs processing. Further, in some embodiments, the MIPs model 1012 may be primed with results from the greedy model 1010, enabling the MIPs model 1012 to start from a somewhat already optimized solution, which may result in quicker elimination of un-optimized paths.

The actionable suggestions tool 1016 may identify and present actionable suggestions that may be implemented to improve placement of units within the placements 1002. For example, in the example provided above with the stronger placement constraints, a graphical user interface of the actionable suggestions tool 1016 may provide an actionable suggestion to reduce the types of units that the unplaced units are constrained against. In some cases, particular types of units may be suggested based upon the candidate placements and/or placements 1002.

Figure 11:
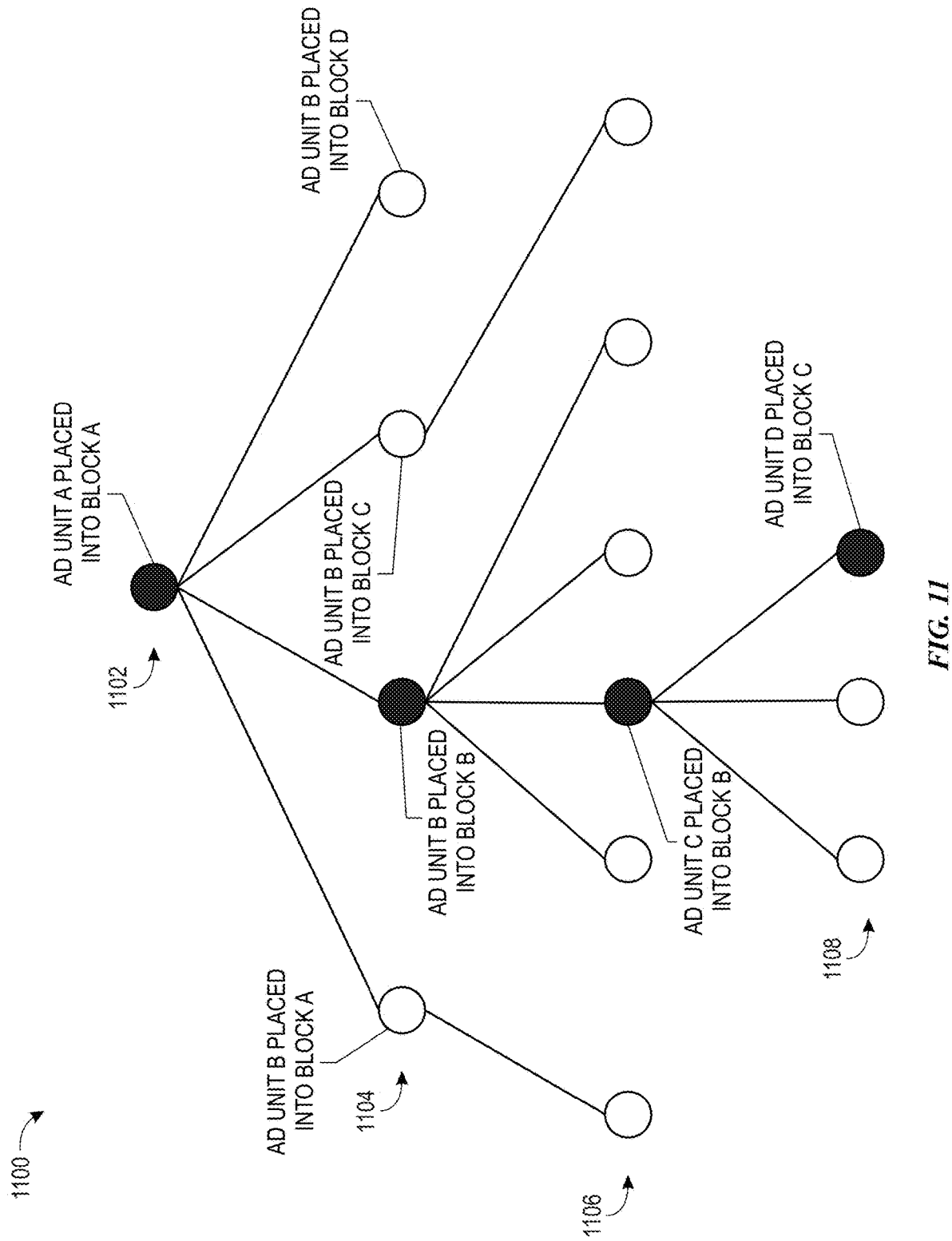
FIG. 11 is a schematic diagram, illustrating an example placement solution found using a greedy placement model, in accordance with certain embodiments.

Turning to a more detailed discussion of the placement models, FIG. 11 is a schematic diagram, illustrating an example placement solution 1100 found using a greedy placement model, in accordance with certain embodiments. The greedy placement model provides an efficient (e.g., fast and less computer-process-intensive) placement strategy, by breaking down the complete universe of placement permutations into a step-by-step optimization, solving a single branch of the placement in each step and then moving to the next placement. For example, as illustrated in solution 1100, an initial step 1102 identifies that unit A should be placed into block A based upon the optimizations for unit A.

Subsequent optimizations are based upon the decision to place unit A in block A. For example, at second step 1104, the greedy placement model determines to place unit B in block B, based upon a placement analysis that assumes unit A is placed in block A.

Similarly, at third step 1106, the greedy placement model determines to place unit C in block B, based upon a placement analysis that assumes unit A is placed in block A and unit B is placed in block B. At fourth step 1108, the greedy placement model determines to place unit D in block C, based upon a placement analysis that assumes all the subsequent determined placements including unit C being placed in block B.

Figure 12:
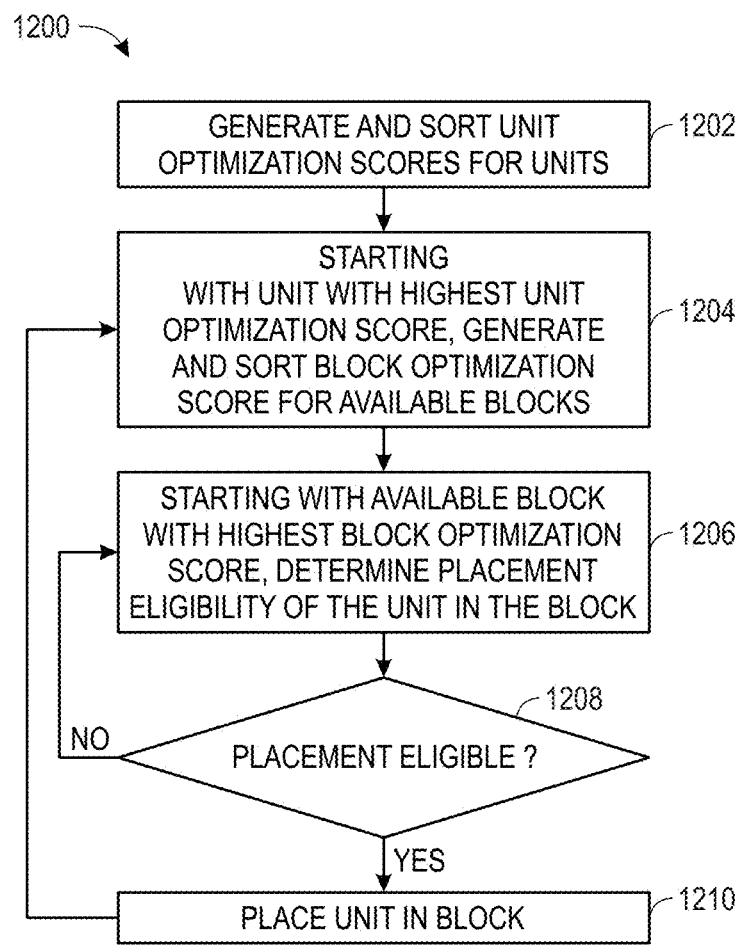
FIG. 12 is a flowchart, illustrating a process for identifying placements using a greedy placement model, in accordance with certain embodiments.
Figure 13:
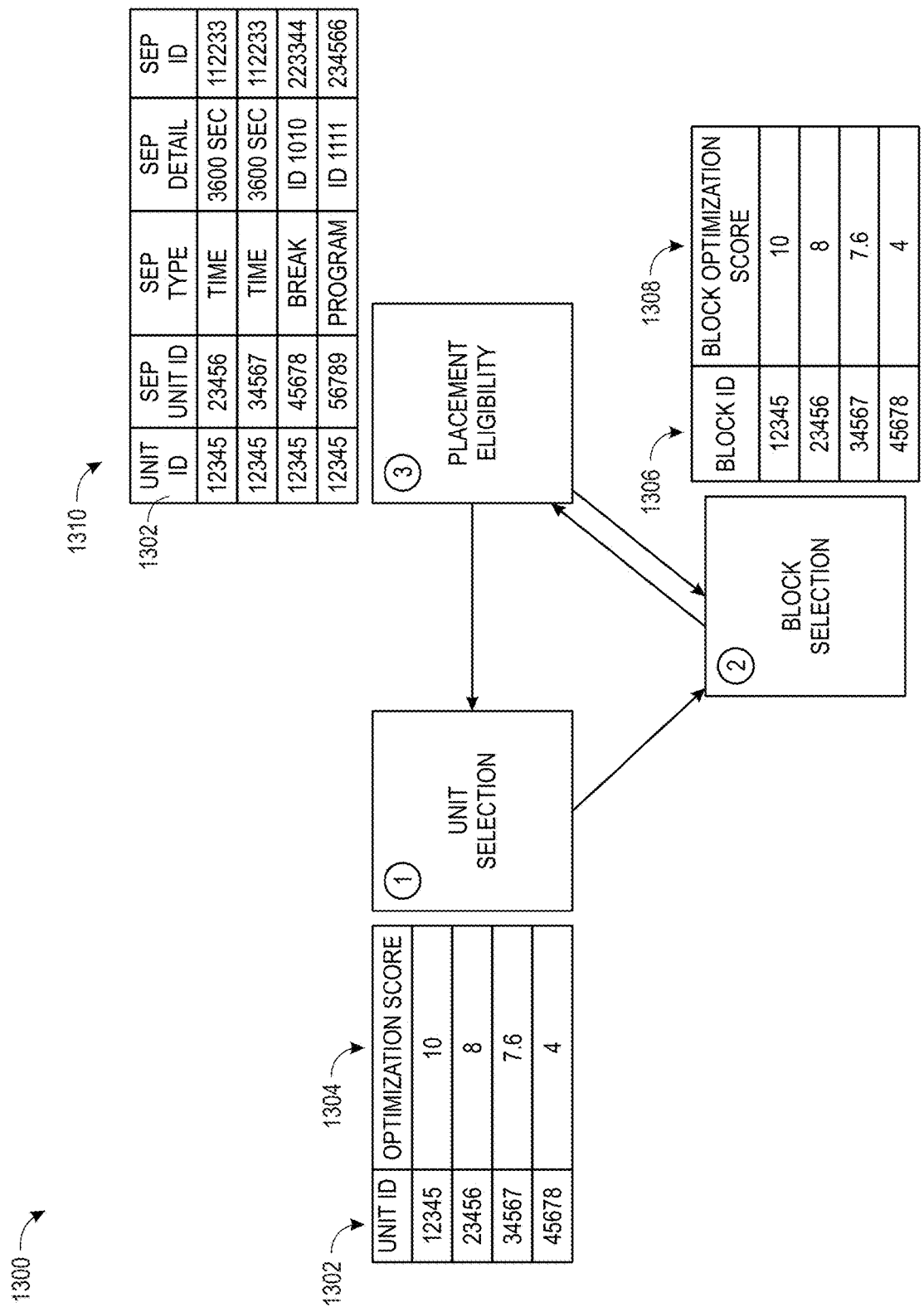
FIG. 13 is a schematic diagram, illustrating an example of identifying placements using the process of FIG. 12, in accordance with certain embodiments.

Turning to a more detailed discussion of the greedy placement model, FIG. 12 is a flowchart, illustrating a process 1200 for identifying placements using a greedy placement model, in accordance with certain embodiments. FIG. 13 is a schematic diagram, illustrating an example 1300 of identifying placements using the process of FIG. 12, in accordance with certain embodiments. For simplicity, these figures will be discussed together.

The greedy placement model may aim to place the "best" or highest priority ad units first. Accordingly, process 1200 begins by generating and sorting units based upon unit optimization scores for each of the units (block 1202). For example, as illustrated in FIG. 13, in the unit selection process, each unit 1302, represented by a unique unit identifier, is provided a unit optimization score 1304. The units 1302 are sorted according to the optimization score indicating highest importance and/or priority.

As mentioned above, there may be many optimization goals. For example, the block fill optimization may attempt to maximize a percent of the block time filled on the log, the number of units optimization may attempt to maximize the number of units placed on the log, the dollars optimization may aim to maximize the dollar amount assigned to the units placed on the log, the ad spot priority optimization may aim to place relatively higher-priority ad units over relatively lower-priority ad units, the impressions optimization may aim to maximize a number of impressions for each plan, and the plan performance optimization may utilized the identified pacing of plans and/or forecasted future impressions to identify placements of units of the various plans.

Depending on the characteristics of the placement scope (e.g., the dates, programs, units to be placed, etc.) each of the optimization goals may be weighted, evaluated, and accumulated into the unit's optimization score.

Starting with the first sorted unit (e.g., the ad unit having the "best" unit optimization score), ad block optimizations scores for the ad unit are generated and sorted (block 1206). As illustrated in FIG. 13, each block 1306 (represented by a block identifier) has a corresponding generated block optimization score 1308, representing how optimized the ad block is for the particular ad unit selected via the ad unit selection process. The blocks 1306 are sorted based upon the block optimization score 1308. The sorted list of blocks is used to iteratively select a block for analysis via a block selection process.

The block optimization score may be determined by looking at block placement goals, such as maximized impression fulfillment and equitable distribution scoring, which aims at spreading the distribution of a plan's units across the placement schedule as opposed to placing a bulk of the placements within a particular subrange of the placement schedule. A spot distribution optimization may aim to evenly distribute plans' units across positions in the blocks. For example first and last spots within a block may be preferred and thus, it may be desirable to evenly distribute placements to these positions across the different plans, ensuring that certain plans do not monopolize these positions.

Starting with the first block (e.g., the "best" block for the current selected unit) selected by the block selection process, a placement eligibility process determines whether the ad unit selected in the unit selection process is eligible to be placed in the ad block selected by the block selection process (block 1206). For example, returning to FIG. 13, a rules datastore 1310 provides rules associated with the units. The selected ad unit and selected ad block are evaluated by the rules of the rule datastore 1310 to determine placement eligibility. For example, as illustrated, ad unit 12345 has a time-based separation rule 112233, constraining against placement of the ad unit 12345 within 3600 seconds of unit 23456. Thus, if unit 23456 was subsequently placed in the selected block and ad unit 12345 could not be placed in the selected block with a time distance greater than 3600 seconds, ad unit 12345 would not be eligible for placement within the selected block. However, because ad unit 12345 is sorted higher in the unit selection process and, thus, placed first, the ad unit is eligible for placement.

Other types of placement rules may also be found in the rules datastore 1310. For example, ad unit 12345 includes a separation break rule indicating that it cannot be placed in a common break with unit 45678 for break number 1010 (e.g., a particular advertisement break in primary content that may include one or more blocks for placement of one or more pieces of supplemental content/advertisements of a particular type). Ad unit 12345 also includes a program break indicating that it cannot be placed in any blocks/spots of program 1111 (e.g., piece of primary content) if unit 56789 is placed within blocks/spots of program 1111.

Placement rules may be contextual or non-contextual. Contextual placement rules define a particular characteristic of when the rule is to be applied, such as a day of the week, date range, etc. Non-contextual placement rules are applied without such particular characteristic specification. For example, if "ID 1010" was not provided in the break rule, this may indicate that the rule applies for all breaks where unit 12345 is placed.

At decision block 1208, if the selected unit is not eligible to be placed in the selected block, the next "best" block is selected and placement eligibility is determined (block 1206). If no eligible placements are found after considering each block, the unit is not placed and the next unit is selected for placement analysis (block 1204).

If, at decision block 1208, the unit is eligible for placement in the selected block, the unit is placed in the selected block (block 1210). Then, the next unit is selected for placement analysis (block 1204). The process 1200 may continue until all units have been selected for placement determination.

As may be appreciated, because the greedy placement model places highest priority ad units first in blocks with the highest ad block optimizations scores, explainability may be easily extracted after each optimization run. Indeed, an explanation for a particular unit's placement may be derived based upon the unit's relative priority, the ad unit's corresponding ad block optimization scores and/or the ad block optimization scores' contributing factors, and/or the ad unit's placement constraint imposed by the placement rules.

Figure 14:
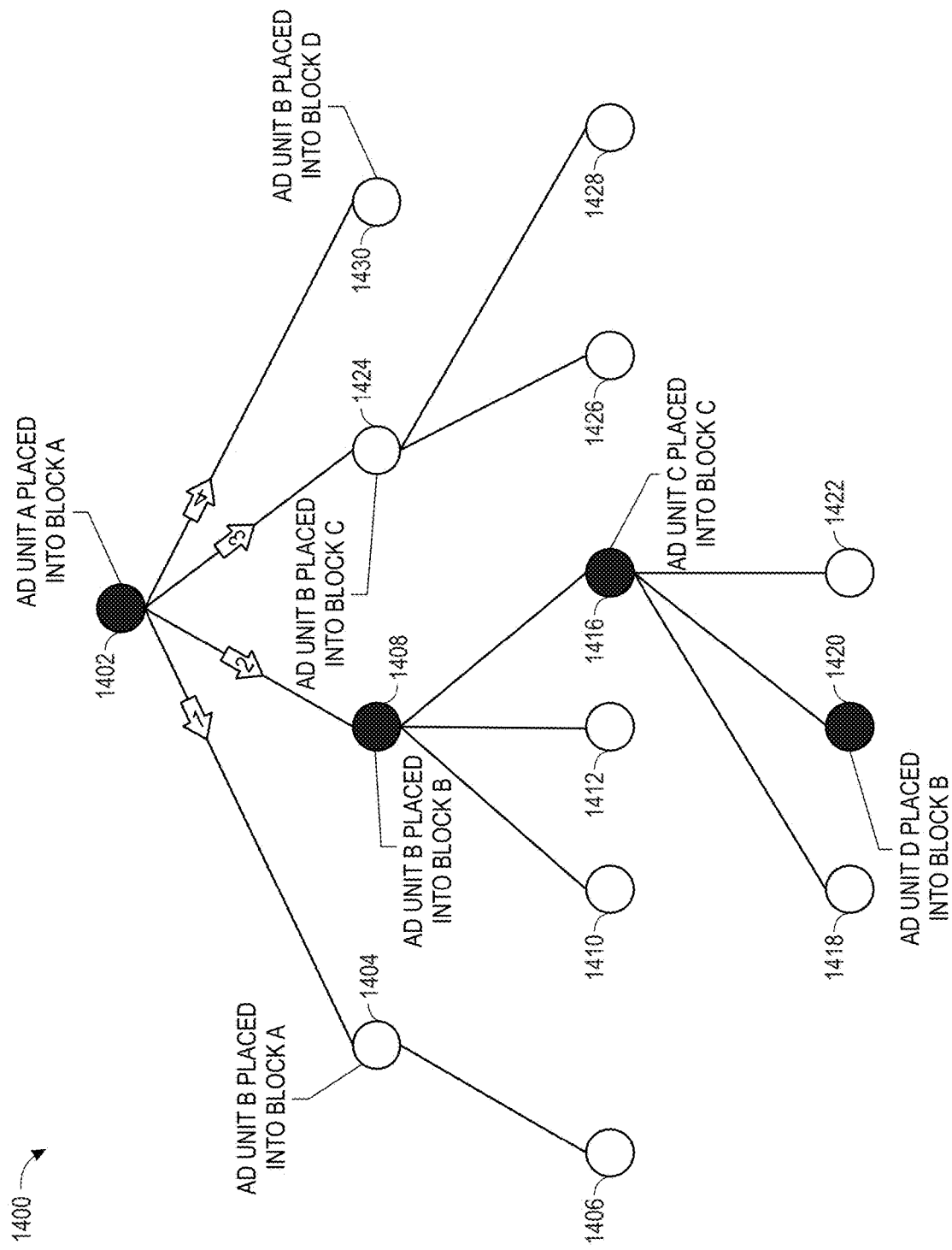
FIG. 14 is a schematic diagram, illustrating an example placement solution found using Mixed Integer Programming (MIPs), in accordance with certain embodiments.

As mentioned above, other placement models may provide more optimized results, by considering the effect of previous placements on current placement choices. Turning to the MIPs placement model, FIG. 14 is a schematic diagram, illustrating an example placement solution 1400 found using Mixed Integer Programming (MIPs), in accordance with certain embodiments. In contrast to the greedy placement model that efficiently decides placements at a unit-level, the MIPs placement model takes a more macro approach to placement, where placement of one unit may affect subsequent unit placement decisions. Specifically, the MIPs placement model uses an objective function to aggregate an optimization score across legs of a path. The path's aggregated optimization score is compared to other paths' aggregated optimization scores to determine the most optimal path.

The objective function may look at similar optimization goals as discussed above with the greedy placement model. In some embodiments, the objective function may calculate:

a unit placement count, indicating a number of units placed in a path, which may be represented by the equation:

$$\text{unit\_placement\_count} = \sum_{U}^{u} \sum_{G \in \text{Blocks\_Per\_Unit}_u}^{g} \text{USN\_PLaced}_{ug}$$

a total unit duration, indicating an aggregated amount of duration of the placed units of the path, which may be represented by the equation:

$$\text{unit\_duration\_obj} = \sum_{U}^{u} \sum_{G \in \text{Blocks\_Per\_Unit}_u}^{g} \text{USN\_PLaced}_{ug} * \text{Unit\_Duration\_Score}_u$$

a dollars objective count, indicating an aggregated revenue for the units placed on the path, which may be represented by the equation:

$$\text{dollars\_obj} = \left( \sum_{U}^{u} \sum_{G \in \text{Blocks\_Per\_Unit}_u}^{g} \text{USN\_PLaced}_{ug} * \text{Dollars\_Score}_u \right);$$

and a business objective count, indicating how well a business goal is met by placements on the path, which may be represented by the equation:

$$\text{business\_obj} = \left( \sum_{U}^{u} \sum_{G \in \text{Blocks\_Per\_Unit}_u}^{g} \text{USN\_PLaced}_{ug} * \text{Business\_Score}_u \right).$$

These calculated features may be weighted by a relative importance of the respective features and aggregated (e.g., summed) to identify the optimization score for the path. The maximum of the identified optimization scores, identifies the optimized path/placements. This may be represented by the equation:

Max:(unit_placement_count*unit_count_weight)+
(unit_duration_obj*block_fill_weight)+
(dollars_obj*dollars_weight)+(business_obj*
business_weight)

For example, referring to FIG. 14, node 1402 illustrates that unit A is placed in block A. The MIPs placement model, may then identify the optimized placement path, by traversing branches extending from node 1402 to identify paths with high optimization scores. For example, at node 1404, a path score is identified based upon unit B being placed in block A. At node 1406 it is determined that based upon unit A being in block A and unit B being in block A, unit C cannot be placed, except in one block, which invalidates placement options for unit D. Thus, this node is selected in this path and unit D is not placed, resulting in finalization of this path's optimization score (by aggregating optimization scores associated with the selected placements along the path).

The MIPs placement model then generates an optimization score for the next path. At node 1408, a new path is generated and scored, assuming unit B is placed into block B. In an aspect, the MIPs placement model may compare the optimization score of the first path with the second to determine whether further analysis of the second path is necessary. In this aspect, if the second path's optimization score were lower than the first path's optimization score, no further analysis of the second path would be needed, as the path would already be less optimal than a previously analyzed path. Here, however, the second path has a higher optimization score than the first path, eliminating the first path (and placement of unit B in block A) as the most efficient solution. Thus, analysis of the second path continues.

The nodes 1410, 1412, and 1416 off of node 1408, representing placements of unit C in blocks A, B, and C, respectively, are analyzed for the highest optimization score for the second path. Here, node 1416, representing placement of unit C into block C is found to provide the highest optimization score. Thus, the second path builds from this node. Each of the nodes 1418, 1420, and 1422, representing placement of the unit D in blocks A, B, and C, respectively, are analyzed to find the highest optimization score. Here, node 1420 is found to cause the highest optimization score for the second path and is selected (along with placement of unit D in block B).

The MIPs placement model continues by analyzing the third path, starting from node 1402 and continuing to node 1424, and representing placement of unit B into block C. Without further analysis of placement of units C and D along this path, the MIPs placement model may not be aware of whether the third path has a highest optimization score. Accordingly, available placement optimization scores are determined for unit C. As illustrated, only two nodes (1426 and 1428) are available, as the MIPs placement model may determine that based upon previous placement selections, placement of unit C may be limited to blocks B or C (e.g., based upon a block separation rule with respect to unit A, which has been placed in block A). It may be determined that the overall optimization score is worse than other paths when placing unit C in either block B or C. Such a scenario enables the MIPs placement model to identify this path as less efficient than other paths already considered, and thus, enable the MIPs placement model to cease calculations for this path, resulting in increased processing efficiencies via reduced processing resource utilization.

As illustrated here, the MIPs placement model also determines that unit D is not eligible for placement in either placement scenario of unit C and, thus, terminates the pathway. The optimization score of the third path is compared to the second path and is found to be less optimal than the second path. Accordingly, the third path is not found to be the most optimized.

Analysis continues to the fourth path, where node 1430, representing placement of unit B in block D, is considered. This placement may result in node C being ineligible for placement, causing the third path to terminate. The optimization score is compared to the second path's optimization score, finding the second path's optimization score to be higher. Accordingly, because the second path's optimization score is higher than all other paths, the second path's candidate placements are selected as the optimized placements.

As may be appreciated, the universe of available units and blocks may be quite large. Accordingly, using the MIPs placement model to look at each of these permutations to derive placement eligibility and optimization scores may be quite processing power intensive and processing time intensive, especially considering that there may be many different separation rules that affect placement eligibility for each of these permutations. Accordingly, it may be important to implement the MIPs placement model in an efficient manner.

One way to add efficiency to the MIPs placement model is to simplify the separation rules for determining whether a placement may occur based upon other placements already existing. FIG. 15A is a schematic diagram, illustrating a separation rule reduction for efficient MIPs placement model processing, in accordance with certain embodiments.

In FIG. 15A, self-separated (unit-to-unit) separation rules that specify a common block window for separation and units to separate from may be composited into a single rule. For example, in the illustrated example, units 1-5 are each associated with a separation rule against each other over blocks 2 and 3. As may be appreciated, unit-to-unit separation rules may, thus, include 25 separation rules to implement. However, the MIPs processing may be optimized by instead grouping these units in a list and allowing no more than 1 unit from the group to be placed in the block window. This effectively reduces the MIPs evaluation from 25 rules down to a single rule, greatly improving MIPs processing efficiencies. This compositing of separation rules may be implemented using the following equation:

$$\sum_{sep\_rule\_unit\_list}^{u} \sum_{sep\_rule\_block\_window}^{g} (USN\_Placed_{ug}) + NumLocked\ Units \leq 1,$$

$$sep\_rule \in Sep\_Rule\_Dict$$

NumLocked Units indicates manually locked in place units. These manually locked units may break separation rules, while the MIPs placement model may not further break the separation rules.

Separation rules may also include non-self-separated separation rules where a group units are to be separated from another group of units. FIG. 15B illustrates an example efficiency implemented for MIPs processing of non-self-separated separation rules, in accordance with certain embodiments. As illustrated, a similar compositing may be performed, this time using two groups of units, where only units of one of the groups of units will be allowed to be placed within the block window (blocks 2 and 3). This may be represented by the following equations:

$$\sum_{prim\_unit\_list}^{u} \sum_{block\_window}^{g} USN\_Placed_{ug} \leq$$

$$len(prim\_unit\_list) * Prim\_Unit\_Group\_Placed_{block\_window}$$

$$Prim\_Unit\_Group\_Placed_{block\_window} \leq$$

$$\sum_{prim\_unit\_list}^{u} \sum_{block\_window}^{g} USN\_Placed_{ug}$$

$$Prim\_Unit\_Group\_Placed_{block\_list} +$$

$$Secondary\_Unit\_Group\_Placed_{block\_list} \leq 1,$$

$$Block\_List \in Sep\_Rule\_Dict$$

In the above equations, Prim_Unit_Group_Placed and Secondary_Unit_Group_Placed are binary variables where "0" and "1" respectively represent non-placement or placement within a block_list for the primary units and the secondary units. If units of the primary group are placed and units from the secondary unit are placed, this will result in a placement violation/ineligibility. Thus, if one of the groups has placed units, units from the other group will not be eligible for placement.

The binary model variable, USN_Placed, represents model non-placement (e.g., via a "0" value) and placement (e.g., via a "1" value) of a unit "u" in a block "g". The sum of all of the USN_Placed values for the primary units in the block window should be less than or equal to the number of primary units multiplied by the number of primary units placed within the block window. Further, the number of primary units multiplied by the number of primary units placed within the block window should be less than or equal to the sum of the USN_Placed for all primary units in the block window.

This composited representation of the separation rules can have a huge impact on solution processing. For example, using individual separation rules processing may take approximately 24 hours, while processing using the composited separation rules reduced processing time to just under 6 minutes.

Figure 16:
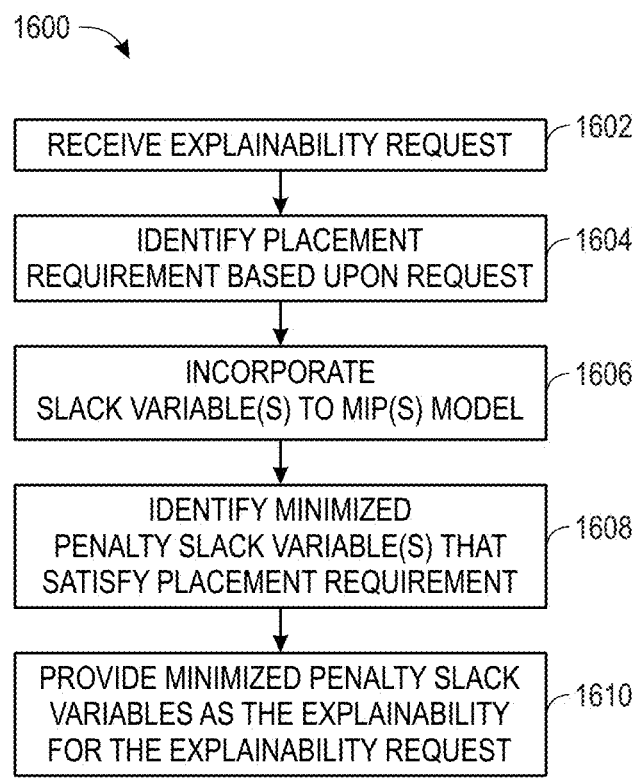
FIG. 16 is a flowchart, illustrating a process for generating explainability from a MIPs placement model, in accordance with certain embodiments.

One other weakness of the MIPs placement model is that may be difficult during runtime to understand placement explainability (e.g., why certain units were or were not placed). FIG. 16 is a flowchart, illustrating a process 1600 for creating a shadow model supplement to mitigate this weakness of the runtime executed of the MIPs placement model.

The process 1600 begins by receiving an explainability request (block 1602). For example, the explainability request may provide an indication to explain placement decisions, such as: Why was Unit1 placed in Block1 instead of Block2? Why weren't all units placed? Why wasn't Block2 completely filled? and/or What would it take to get Unit2 placed?

Based upon the explainability request, placement requirements for a shadow model (e.g., an explanation-solving rerun of the MIPs placement model) may be identified (block 1604). The placement requirements for providing explainability may hypothetically fulfill unplaced units indicated in the explainability request. For example, the placement requirement for a request to explain why Unit1 was placed in Block1 instead of Block2 may be placing Unit1 in Block2 instead of Block1. A placement requirement for a request to explain why all units were not placed may be placing all units. A placement requirement for a request to explain why Block2 was not completely filled may be completely filling Block2 with placements. A placement requirement for a request to explain what it would take to get Unit2 placed would be placing Unit2.

A modified shadow model of the MIPs placement model is generated that incorporates one or more slack variables (block 1606). The slack variables provide an ability for the shadow model to break one or more constraints to satisfy the placement requirement. For example, a slack variable may allow the shadow model to break one or more separation rules to fulfill the identified placement requirement. Slack variable incorporation for self-separated placement rules may be represented by the equation:

$$\sum_{sep\_rule\_unit\_list}^{u} \sum_{sep\_rule\_block\_list}^{g} (USN_{Placed_{ug}}) + Num_{Locked_{Units}} \le$$

$$1 + \text{Slack\_variable}_{block\_list},$$

$$sep\_rule \in Sep\_Rule\_Dict$$

Slack variable incorporation for non-self-separated placement rules may be represented by the equation:

Primary_Unit_Group_Placed$_{block\_list}$+Secondary_Unit_Group_Placed$_{block\_list\le 1}$+Slack_variable$_{block\_list}$,Block_List∈Sep_Rule_Dict Each of the slack variables may be associated with a corresponding penalty value. The penalty values may accumulate as slack variables are relied upon to fulfil the placement requirement. Thus, the penalty values may be used to find a solution with a minimum penalty and, thus, a solution that relies the least on the slack variables (block 1608).

$$\text{Slack\_Penalty\_obj} = \left( \sum_{Sep\_Rule\_dict}^{block\_list} \text{Slack\_variable}_{block\_list} * -\text{Slack\_Penalty} \right)$$

The slack variables associated with this minimum penalty solution may be provided as the explainability for the explainability request (block 1610). For example, these slack variables may be provided via the placement explainability tool 1014 of FIG. 10 to provide an indication of particular placement rules that affect the placement indicated in the explainability request.

Figure 17:
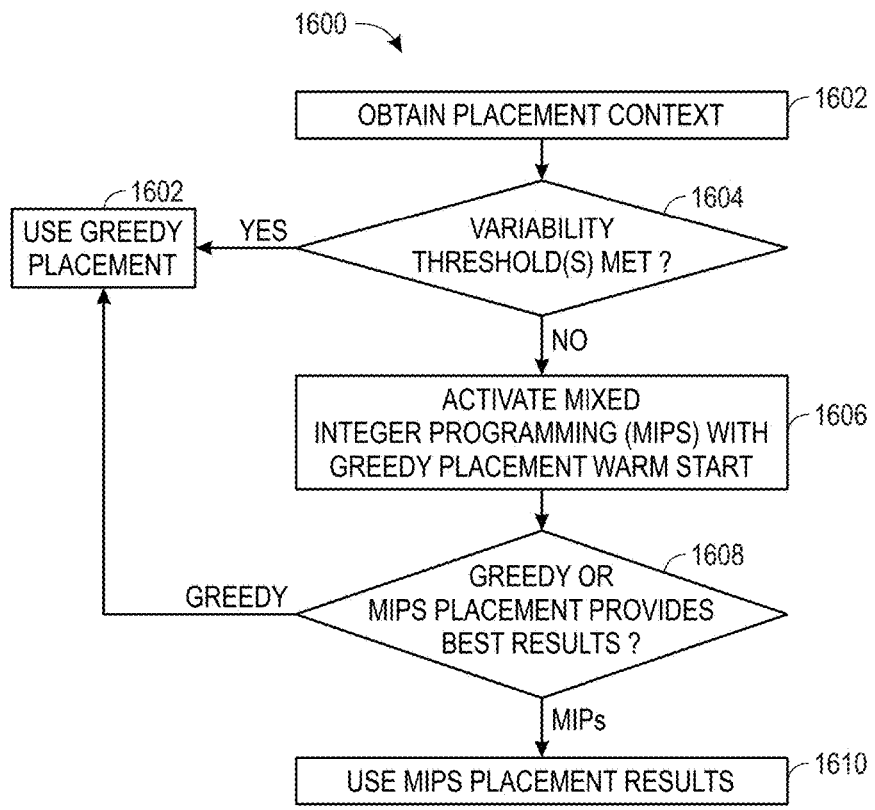
FIG. 17 is a flowchart, illustrating a process for selecting a placement model for identifying placements, in accordance with certain embodiments.

Having discussed modifications for the MIPs placement model provide increased efficiencies and functionality, the discussion now turns to suitable model selection for placement. As mentioned above, a model evaluator/selector may select between placement models to identify a desirable placement solution. FIG. 17 is a flowchart, illustrating a process 1700 for selecting a placement model for identifying placements, in accordance with certain embodiments.

The process 1700 begins by obtaining a placement context (block 1702). Specifically, a time until actual log placement and/or log placement completion value may be determined to identify a variability metric (e.g., how likely changes to supplemental content offerings for the linear log will change, how variable the placement solutions provided from a particular model will change and/or from model to model will change, etc.). For example, relatively close to air/implementation of a linear log's schedule, a relatively large number of additional units and associated constraints may become available. These additional units and associated constraints may vastly change the placement selections for the linear log. However, there may still be a desire to understand how plans/campaigns are progressing, available blocks for supplemental content provision, etc. far earlier (e.g., a quarter-year prior to air, etc.). The placement context may provide an indication of the expected variability of the linear log.

At decision block 1704 a determination is made as to whether the placement context meets a variability threshold. For example, the variability threshold may be a value (e.g., percentage) indicating how filled the linear log is, such as 60% filled. In some embodiments, the variability threshold may be a number of days until the linear log is aired. As may be appreciated, the variability threshold, by measuring how "complete" the log is, how "close to air" the log is, etc., may indicate how likely significant changes will occur to the linear log.

If the variability threshold is met, the greedy placement model is used to determine placement (e.g., without the MIPs placement model) (block 1706). In this scenario, the greedy placement model may be used because the granular optimizations of the MIPs placement model may not be needed at this point, as the linear log may be likely to change significantly prior to air.

However, if the variability threshold is not met, the MIPs placement model is activated (block 1708). In some embodiments, the MIPs placement model may be implemented with a "warm start" input of the Greedy placement model's optimized solution. In this manner, the MIPs placement model may start with the Greedy placement model's optimal solution as a "path to beat." Thus, as soon as other evaluated paths do not beat the optimization score of the Greedy placement model's optimized solution, it can be dropped and evaluation can proceed to the next path. This may greatly improve processing speed and efficiency, requiring far fewer processing resources than starting the MIPs placement model analysis from scratch.

At decision block 1710, the Greedy placement model's optimized solution is compared to the MIPs placement model's solution to identify which of these solutions provides the maximized optimal results. If the Greedy placement model's results are more optimized than the MIPs placement model results, the results of the Greedy placement model are used (block 1706). However, if the MIPs placement model's results are more optimized, the MIPs placement model results are used (block 1712).

Figure 18:
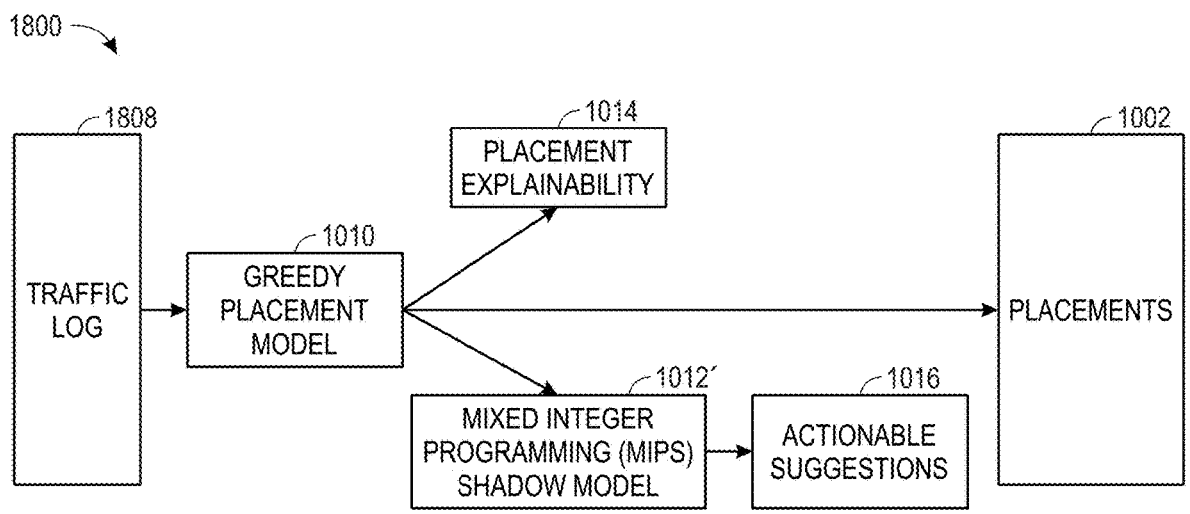
FIG. 18 is a schematic diagram, illustrating a placement selection flow with a linear log having characteristics indicative of a likely subsequent threshold of change, in accordance with certain embodiments.

FIG. 18 is a schematic diagram, illustrating a placement selection flow 1800 with a linear log having characteristics indicative of a likely subsequent threshold of change, in accordance with certain embodiments. In the illustrated embodiment, the linear log meets the variability threshold (e.g., because the log is not close to air and/or is less than 60% filled, etc.). Thus, the traffic log 1008, indicating the units to be placed, is provided to the Greedy placement model 1010. The Greedy placement model 1010 is able to provide a placement explainability via the placement explainability tool 1014, based upon the step-by-step placement selection. Further, the Greedy placement model 1010 may select the placements 1002. As may be appreciated, these placement 1002 may change over time as the models are re-run at period intervals up until air time (e.g., daily).

Optionally, when actionable selections are desired to be offered, the MIPs Shadow Model 1012' may be implemented, providing actionable suggestions for to the Actionable Suggestions Tool 1016, enabling provision of these actionable suggestions.

Figure 19:
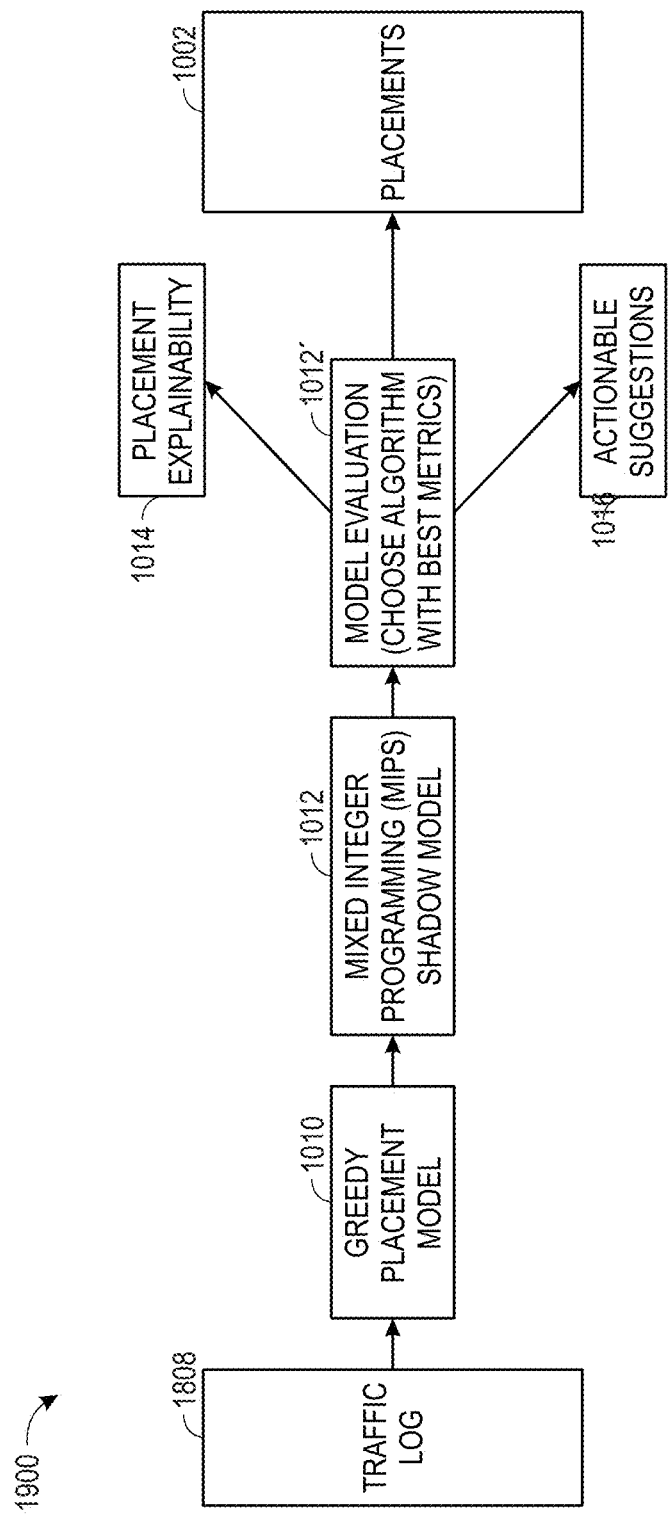
FIG. 19 is a schematic diagram, illustrating a placement selection flow with a linear log having characteristics indicative of unlikely subsequent threshold of change, in accordance with certain embodiments.

Once the variability threshold is no longer met, meaning the linear log is coming to completion (e.g., based upon being 60% full or more, being within 1 week of air, etc.), the MIPs placement model 1012 may be implemented to identify granular placements. FIG. 19 is a schematic diagram, illustrating a placement selection flow 1900 with a linear log having characteristics indicative of unlikely subsequent threshold of change, in accordance with certain embodiments. As illustrated, the traffic log 1008 provides data to the Greedy placement model 1010. In the current embodiment, the Greedy placement model 1010 provides a "warm start" or base optimized starting point for the MIPs placement model 1012. As mentioned above, this may provide the MIPs placement model 1012 with a solution to beat, which may greatly improve processing resource and time utilization.

From time to time, the Greedy placement model 1010 may provide a more optimized solution than the MIPs placement model 1012. Accordingly, solutions from both the Greedy placement model 1010 and the MIPs placement model 1012 are provided to the Model Evaluation and Selector 1004, which may compare these results and select results of the model that are best optimized. The selected results are assigned as the placements 1002. Further, the results may be used to enable the Placement Explainability Tools 1014 to provide placement explanations and the Actionable Suggestions Tool 1016 to provide actionable suggestions, as discussed herein.

The technical effects of the present disclosure include cross-platform balancing of viewer impressions across plans for the distinct platforms. Further, a linear log optimizer optimizes supplemental content placements within linear content provision to facilitate accurate impression deliverables, using optimized placement models that may provide solutions in a matter of minutes rather than days.

While only certain features of the invention have been illustrated and described herein, many modifications and changes will occur to those skilled in the art. It is, therefore, to be understood that the appended claims are intended to cover all such modifications and changes as fall within the true spirit of the invention.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for (perform)ing (a function) . . . " or "step for (perform)ing (a function) . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A tangible, non-transitory, computer-readable medium, comprising computer-readable instructions that, when executed by one or more processors of one or more computers, cause the one or more computers to:
    identify supplemental content to be provided with primary content;
    identify a number of cross-platform impressions for the supplemental content, the number of cross-platform impressions comprising a number of presented views of the supplemental content to provide across both a linear content platform and a digital content streaming platform;
    identify a first impression estimate for provision of the supplemental content via the linear content platform and a second impression estimate for provision of the supplemental content via the digital content streaming platform; and
    implement capacity balancing configured to reduce excess capacity in the linear content platform, the digital content streaming platform, or both based upon the first impression estimate and the second impression estimate, and the number of cross-platform impressions.

2. The tangible, non-transitory, computer-readable medium of claim 1, comprising computer-readable instructions that, when executed by the one or more processors of the one or more computers, cause the one or more computers to:
    implement the capacity balancing by identifying the excess capacity in the linear content platform; and
    adjust down a forecasted number of impressions of the linear content platform by increasing a placement of the supplemental content via the digital streaming platform.

3. The tangible, non-transitory, computer-readable medium of claim 1, comprising computer-readable instructions that, when executed by the one or more processors of the one or more computers, cause the one or more computers to:
    implement the capacity balancing by identifying the excess capacity in the digital content streaming platform; and
    adjusting down a forecasted number of impressions of the digital content streaming platform by increasing a placement of the supplemental content via the linear content platform.

4. The tangible, non-transitory, computer-readable medium of claim 1, comprising computer-readable instructions that, when executed by the one or more processors of the one or more computers, cause the one or more computers to:
    identify the first impression estimate by:
        identifying a linear likelihood of placement that the supplemental content will be placed in a supplemental content block of the primary content via the linear content platform;
        identifying a linear fractional placement value indicating a fractional expected placement of the supplement content in the supplemental content block by applying a constrained optimization model bounded by one or more linear constraints to the linear likelihood of placement; and
        identifying a number of forecasted linear impressions of a target audience of the supplemental content and multiplying the number of forecasted linear impressions of the target audience by the linear fractional placement value.

5. The tangible, non-transitory, computer-readable medium of claim 1, comprising computer-readable instructions that, when executed by the one or more processors of the one or more computers, cause the one or more computers to:
    implement the capacity balancing by:
        identifying a first cost associated with placement of the supplemental content via the linear content platform;

identifying a second cost associated with placement of the supplemental content via the digital content streaming platform;
identifying a total cost by adding the first cost and the second cost; and
capping the total cost to not exceed a total budget of a campaign to place the supplemental content.

6. The tangible, non-transitory, computer-readable medium of claim 4, comprising computer-readable instructions that, when executed by the one or more processors of the one or more computers, cause the one or more computers to:
identify the linear likelihood by:
identifying a plurality of plans that can be placed in the supplemental content block, each of the plurality of plans comprising an associated piece of supplemental content, an associated target audience, and an associated number of forecasted impressions based upon the associated target audience;
identifying placement factor values of each of the plurality of plans; and
for each of the plurality of plans, model placement of the plans in the supplemental content block and other supplemental content blocks, based upon the identified placement factor values, wherein the modelled placement indicates the linear likelihood of placement, the linear fractional placement, or both.

7. The tangible, non-transitory, computer-readable medium of claim 4, comprising computer-readable instructions that, when executed by the one or more processors of the one or more computers, cause the one or more computers to:
identify the second impression estimate by:
identifying a digital likelihood of impressions that the supplemental content will be placed over other supplemental content via the digital content streaming platform;
identifying a digital fractional placement value indicating a digital fractional expected placement of the supplement content by applying a constrained optimization model bounded by one or more digital constraints to the digital likelihood of placement; and
identifying a number of digital forecasted impressions of a target audience of the supplemental content via the digital content streaming platform and multiplying the number of forecasted digital impressions of the target audience by the digital fractional placement value.

8. The tangible, non-transitory, computer-readable medium of claim 6, wherein the placement factor values comprise a normalized target audience impression probability distribution indicating, for each of the plurality of plans, a normalized factor of how well-suited the supplemental content block is for the associated target audience.

9. The tangible, non-transitory, computer-readable medium of claim 6, wherein the placement factor values comprise a normalization across all target audiences, indicating, for each of the plurality of plans, how well the plan's number of forecasted impressions compares to other plan's number of forecasted impressions for the supplemental content block.

10. The tangible, non-transitory, computer-readable medium of claim 6, wherein the placement factor values comprise: a separation pressure for each of the plurality of plans, indicating a relative difficulty of placing corresponding supplemental content based upon separation rules with other supplemental content.

11. The tangible, non-transitory, computer-readable medium of claim 6, wherein the placement factor values comprise:
a pacing value for each of the plurality of plans, indicating a relative pace of satisfaction of placement goals of placing corresponding supplemental content;
a time to end of flight value for each of the plurality of plans, indicating a corresponding remaining time for the satisfaction of the placement goals; or
both.

12. The tangible, non-transitory, computer-readable medium of claim 6, wherein the placement factor values comprise:
for each of the plurality of plans, a cost per quantity of impressions presented;
for each of the plurality of plans, a duration of corresponding supplemental content; or
both.

13. The tangible, non-transitory, computer-readable medium of claim 7, comprising computer-readable instructions that, when executed by the one or more processors of the one or more computers, cause the one or more computers to:
identify the second impression estimate by:
identifying a reach of placement of the supplemental content via the digital streaming platform; and
multiplying the reach by a frequency cap indicating a number of times the supplemental content may be viewed via an audience of the reach.

14. A computer-implemented method, comprising:
identifying supplemental content to be provided with primary content;
identifying a number of cross-platform impressions for the supplemental content, the number of cross-platform impressions comprising a number of presented views of the supplemental content to provide across both a linear content platform and a digital content streaming platform;
identifying a first impression estimate for provision of the supplemental content via the linear content platform and a second impression estimated for provision of the supplemental content via the digital content streaming platform; and
implementing capacity balancing configured to reduce excess capacity in the linear content platform, the digital content streaming platform, or both based upon the first impression estimate, the second impression estimate, and the number of cross-platform impressions.

15. The computer-implemented method of claim 14, comprising:
implementing the capacity balancing by identifying the excess capacity in the linear content platform; and
adjusting down a forecasted number of impressions of the linear content platform by increasing a placement of the supplemental content via the digital content streaming platform; or
implementing the capacity balancing by identifying the excess capacity in the digital content streaming platform; and
adjusting down a forecasted number of impressions of the digital content streaming platform by increasing a placement of the supplemental content via the linear content platform; or
both.

16. The computer-implemented method of claim 14, comprising:
identifying a linear likelihood of placement that the supplemental content will be placed in a supplemental content block of the primary content via the linear content platform, by:
identifying a plurality of plans that can be placed in the supplemental content block, each of the plurality of plans comprising an associated piece of supplemental content, an associated target audience, and an associated number of forecasted impressions based upon the associated target audience;
identifying placement factor values of each of the plurality of plans; and
for each of the plurality of plans, model placement of the plans in the supplemental content block and other supplemental content blocks, based upon the identified placement factor values, wherein the modelled placement indicates the linear likelihood of placement; or
identifying a digital likelihood of impressions that the supplemental content will be placed over other supplemental content via the digital content streaming platform, by:
for each of the plurality of plans, model placement of the plans via the digital content streaming platform, based upon the identified placement factor values, wherein the modelled placement indicates the digital likelihood of impressions; or
both.

17. The computer-implemented method of claim 14, comprising:
implementing the capacity balancing by:
identifying a first cost associated with placement of the supplemental content via the linear content platform;
identifying a second cost associated with placement of the supplemental content via the digital content streaming platform;
identifying a total cost by adding the first cost and the second cost; and
capping the total cost to not exceed a total budget of a campaign to place the supplemental content.

18. The computer-implemented method of claim 16, wherein the placement factor values comprise:
a normalized target audience impression probability distribution indicating, for each of the plurality of plans, a normalized factor of how well-suited the supplemental content block is for the associated target audience;
a normalization across all target audiences, indicating, for each of the plurality of plans, how well the plan's number of forecasted impressions compares to other plan's number of forecasted impressions for the supplemental content block; or
both.

19. The computer-implemented method of claim 16, wherein the placement factor values comprise:
a separation pressure for each of the plurality of plans, indicating a relative difficulty of placing corresponding supplemental content based upon separation rules with other supplemental content;
a pacing value for each of the plurality of plans, indicating a relative pace of satisfaction of placement goals of placing corresponding supplemental content;
a time to end of flight value for each of the plurality of plans, indicating a corresponding remaining time for the satisfaction of the placement goals;
for each of the plurality of plans, a cost per quantity of impressions presented;
for each of the plurality of plans, a duration of corresponding supplemental content; or
any combination thereof.

20. The computer-implemented method of claim 16, comprising:
identifying the first impression estimate by:
identifying a number of forecasted linear impressions of a target audience of the supplemental content and multiplying the number of forecasted linear impressions of the target audience by a linear fractional placement value derived by constraining the linear likelihood of placement to one or more linear platform constraints; or
identifying the second impression estimate by:
identifying a number of digital forecasted impressions of a target audience of the supplemental content via the digital content streaming platform and multiplying the number of forecasted digital impressions of the target audience by a digital fractional placement value derived by constraining the digital likelihood of impressions to one or more digital platform constraints; or
both.

* * * * *